UNITED STATES PATENT OFFICE.

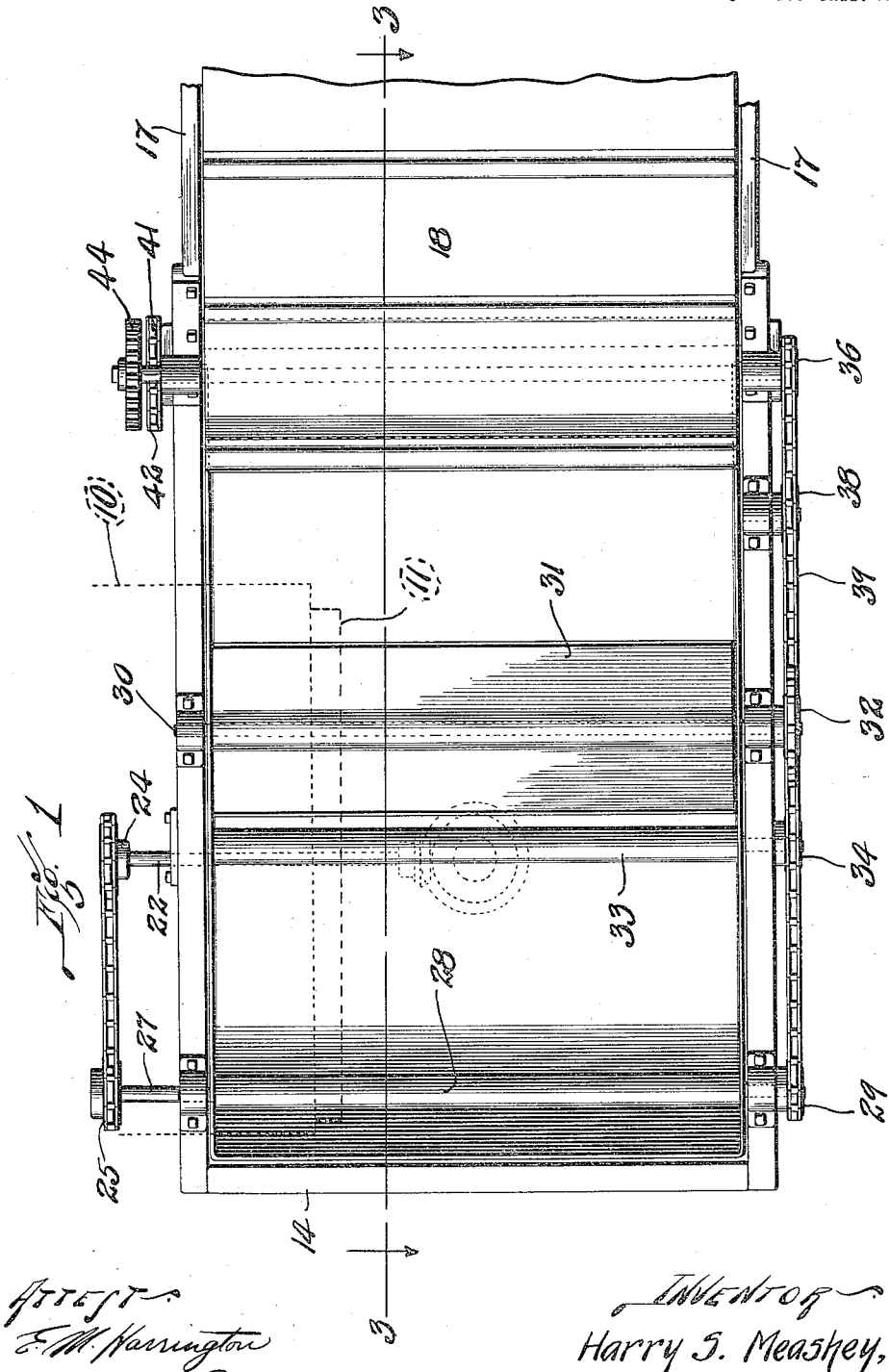

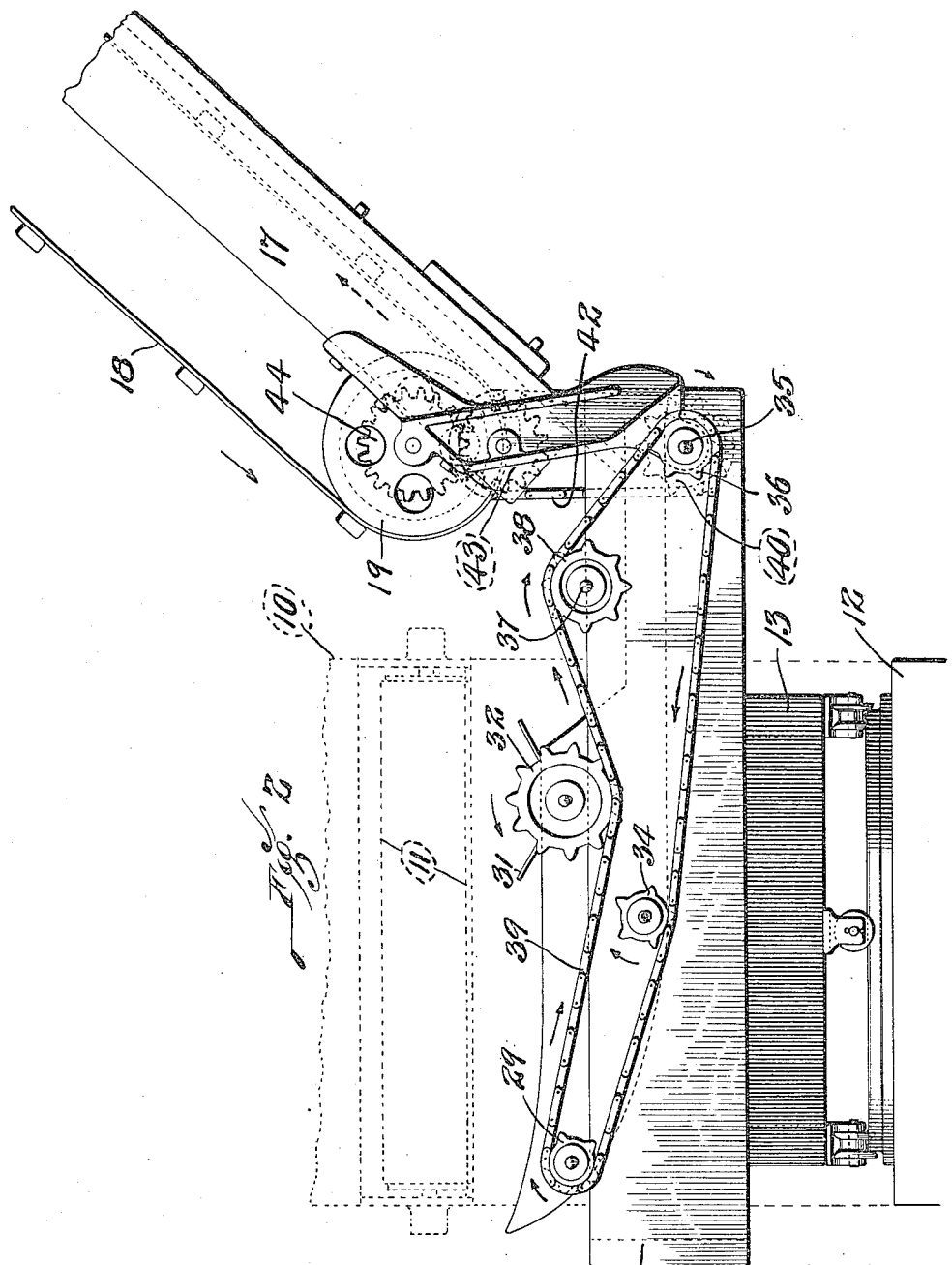

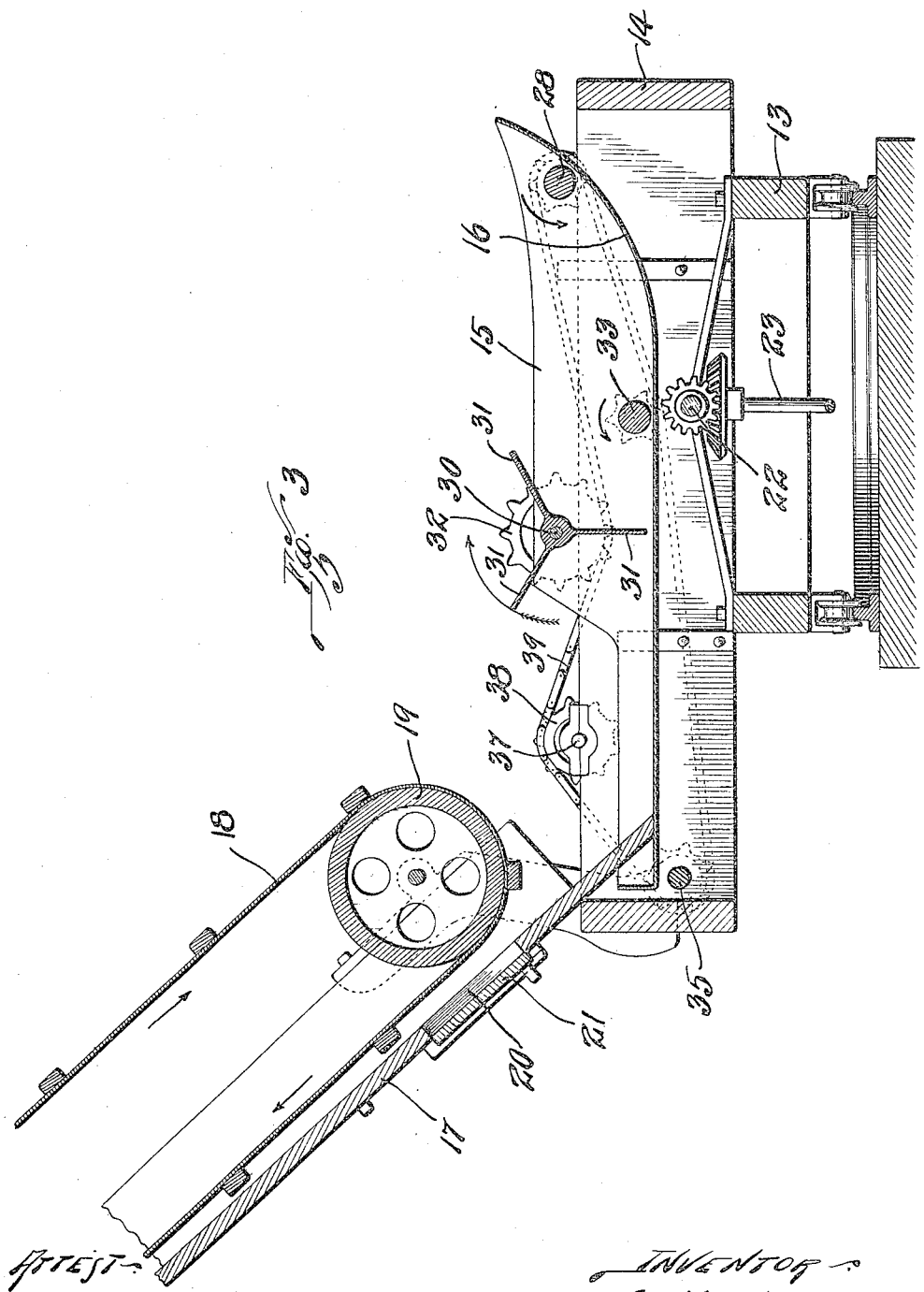

HARRY S. MEASHEY, OF MIDDLETOWN, PENNSYLVANIA.

SWINGING STACKER FOR THRESHING-MACHINES.

1,159,405.  Specification of Letters Patent. Patented Nov. 9, 1915.

Application filed August 31, 1914. Serial No. 859,304.

*To all whom it may concern:*

Be it known that I, HARRY S. MEASHEY, a citizen of the United States, residing at Middletown, Pennsylvania, have invented a certain new and useful Improvement in Swinging Stackers for Threshing-Machines, of which the following is a full, clear, and exact description, such as will enable others skilled in the art to which it appertains to make and use the same, reference being had to the accompanying drawings, forming part of this specification, in which—

Figure 1 is a plan view of a pan or hopper which is mounted at the discharge end of a threshing machine and upon which my improved swinging stacker is carried. Fig. 2 is a side elevational view of the pan or hopper and the lower end of the swinging stacker. Fig. 3 is a sectional view taken approximately on line 3—3 of Fig. 1.

My invention relates generally to threshing machines and more particularly to a swinging stacker which is utilized at the discharge end of the threshing machine for elevating the straw and chaff discharged from the machine.

My invention further relates to means for receiving and delivering to the lower end of the conveyer of the stacker, the straw and chaff from the threshing machine.

In certain types of threshing machines now in general use, an intermediate endless conveyer is arranged beneath the discharge end of the thresher for delivering the straw and chaff to the lower end of the stacker conveyer, but such construction has been found objectionable, owing to the fact that said intermediate conveyer is not effective in delivering practically all of the straw and chaff to the conveyer in the stacker, and further, the intermediate conveyer is subject to great wear, and therefore, must be often renewed and repaired.

The principal object of my invention is to overcome the objectionable features just mentioned, by providing a construction wherein the intermediate conveyer is entirely eliminated.

Further objects of my invention are, to provide a pan or hopper which is mounted beneath the discharge end of the threshing machine so as to swing from one side to the other; to mount the lower end of the stacker on the frame in which the pan or hopper is positioned; to arrange within the pan or hopper a series of positively driven devices, including a winged beater which serves to deliver the straw and chaff directly to the endless conveyer arranged in the stacker, and to provide simple means whereby the chaff may be readily discharged from the stacker, if desired.

With the foregoing and other objects in view, my invention consists in certain novel features of construction and arrangement of parts, hereinafter more fully described and claimed.

Referring by numerals to the accompanying drawings, 10 designates the rear end portion of the threshing machine, 11 the discharge conveyer which brings the straw and chaff out of the machine, 12 a portion of the framework, at the rear lower end of the thresher, and 12 a frame or turn-table which is rotatably mounted upon the frame 12. All of the parts just mentioned are of the usual well-known construction.

Mounted on top of the turn-table 13 and immediately below the outer end of the conveyer 11 is a frame 14 in which is positioned a shallow pan or hopper 15, the same being preferably constructed of sheet metal and having its bottom curved gradually upward at one end as designated by 16. Hinged in any suitable manner to one end of the frame 14 and opposite to the curved end of the pan 15 is the lower end of a stacker frame 17 in which is arranged for operation the usual endless conveyer 18, the same passing around a suitable drum 19 at the lower end of said frame 17. This endless conveyer is of the usual type including a beater or flexible member provided with transverse slats and the under-running portion of this conveyer rides directly upon or immediately adjacent to the upper face of the bottom of the stacker frame. Formed in the lower portion of the bottom of the frame 17 and near the drum 19 is a chaff outlet opening 20, the same being normally closed by a sliding gate 21. By opening this sliding gate a discharge of the chaff can be effected at the lower end of the stacker, which chaff would otherwise be taken to the top of the stacker with the straw.

A driving shaft 22 is journaled in suitable bearings in the lower portion of frame 14, said shaft being driven by means of beveled gearing from a vertically disposed shaft 23, the axis of which is coincident with the axis of the turn-table 13. This last mentioned shaft 23 is driven in any suitable manner from the threshing machine. One end of this shaft projects beyond one of the side walls of the frame 14, and fixed on said projecting end is a sprocket wheel 24. Passing around this wheel is a sprocket chain 25, which latter passes around a sprocket wheel 26 which is fixed on the projecting end of a shaft 27, the same being journaled in suitable bearings near one end of the frame 14. Fixed on this shaft 27 within the curved end of the pan or hopper 15 is a roller 28.

Fixed on the end of the shaft 27 opposite the end carrying the sprocket wheel 25 is a sprocket wheel 29. Journaled in suitable bearings on top of the side members of the frame 14 and near the center thereof is a shaft 30, and positioned thereon within the pan or hopper 15 is a series of radially arranged blades 31. This shaft with its blades serves as a beater to throw the straw and chaff from the central portion of the pan toward the end which is directly beneath the lower end of the conveyer 18. One end of the shaft 30 projects beyond the frame 14 and receives a sprocket wheel 32. Arranged for rotation in the lower portion of the pan 15 between the shaft 30 and roller 28 is a roller 33, the same being provided at one end with a trunnion which projects beyond the side of the frame 14 and carries a sprocket wheel 34.

Journaled in suitable bearings at the end of frame 14 to which the stacker is connected is a shaft 35, one end of which projects beyond said frame 14 to receive a sprocket wheel 36. Positioned on top of the frame 14 and near the end to which the stacker is connected is a short shaft 37 on which is fixed a sprocket wheel 38. A sprocket chain 39 passes around the sprocket wheel 29 beneath the sprocket wheel 32 over the sprocket wheel 38 which serves as an idler around the sprocket wheel 36 and beneath the sprocket wheel 34, and thus rotary motion is imparted to the rollers 28 and 33 and to the beater comprising the shaft 30 and blades 31. Fixed on the end of the shaft 35 opposite the end carrying the sprocket wheel 36 is a sprocket wheel 40 and operating thereon and upon a sprocket wheel 41 which is carried by a short shaft journaled in suitable bearings on the corresponding side of the stacker frame 17 is a sprocket chain 42. Fixed on the same shaft with the sprocket wheel 41 is a small gear wheel 43, the same meshing with a corresponding gear wheel 44 which latter is fixed on the end of the shaft which carries the drum 19.

The operation of my improved stacker is as follows: Simultaneous with the operation of the threshing machine and the delivery of straw and chaff by the conveyer 11 into the pan or hopper 15, shaft 23 is driven from the threshing machine and the rotary motion of this shaft is transmitted by the beveled pinions to shaft 22. This rotary motion is transmitted to shaft 27 through sprocket chain 25, and thus roller 28 is rotated in the curved end of the pan 15. Corresponding rotary motion is imparted to roller 33 by means of sprocket chain 39, and thus both rollers 28 and 33 are rotated toward the beater comprising the shaft 30 and plates 31, thereby tending to feed toward said beater all straw and chaff which may be delivered onto said rollers. The beater is rotated in the direction indicated by the arrow in Fig. 3 and the plates or wings forming a part of said beater throw the straw and chaff toward the end of the pan 15 to which the stacker is connected. Rotary motion is imparted to shaft 35 by the chain 39, and this motion is transmitted to sprocket wheel 41 and pinion 43 by chain 42 and pinion 43 transmits motion to pinion 44 which is fixed on the shaft which carries the drum 19. Thus the endless conveyer or elevator 18 is operated and the straw and chaff delivered to the end of the pan beneath said drum 19 will be engaged and carried upward by the under-running portion of the conveyer which operates upon the bottom of the frame 17.

Should it be desired to effect a discharge of the chaff instead of permitting it to pass to the top of the stacker with the straw, the gate 21 can be moved upward a slight distance, thereby providing an opening in the bottom of the frame 17 through which the chaff will discharge.

The frame 14 carrying the pan and the stacker can be swung to either side of the threshing machine by a proper manipulation of the turn-table 13, and as the lower end of the stacker frame 17 is hinged to the frame 14, said stacker frame can be raised or lowered as desired. As the frame 14 is swung from one side to the other, it will be understood that the pan 15 remains in position directly beneath the end of the conveyer 11, and thus at all times, the straw delivered by said conveyer 11 will discharge into the pan and by means of the beater and rollers operating therein, said straw will be delivered to the conveyer or elevator 18 forming a part of the stacker.

The pan provides simple means whereby practically all of the straw and chaff discharged from the thresher is delivered to the stacker and the rollers and beater operating in said pan provide simple means for positively carrying all of the straw and chaff to the elevator of the stacker.

The rollers and beater perform the functions of an endless conveyer usually employed for delivering straw and chaff to the stacker, and which endless conveyer, as heretofore stated, wears rapidly, therefore necessitating frequent repairs and renewals.

It will be readily understood that minor changes in the size, form and construction of the various parts of my improved machine may be made and substituted for those herein shown and described, without departing from the spirit of my invention, the scope of which is set forth in the appended claims.

I claim:

1. In a threshing machine, means for delivering straw and chaff from the discharge end of the machine to the stacker, which means comprises a shallow pan, a transversely disposed beater mounted for rotation near the center of the pan, a pair of rollers mounted for rotation in the bottom of said pan on the opposite side of the beater from the stacker, and means for simultaneously rotating said beater and rollers.

2. In a threshing machine, means for delivering straw and chaff from the discharge end of the machine to the stacker, which means comprises a hopper, a beater mounted for rotation therein, rollers mounted for rotation in the bottom of the hopper, and means for simultaneously rotating the rollers toward the beater and the beater toward the rollers.

3. In threshing machine, means for delivering straw and chaff from the discharge end of the machine to the stacker, which means comprises a hopper, a beater mounted for rotation therein, rollers mounted for rotation in the bottom of said hopper, and means for simultaneously operating the beater and rollers.

In testimony whereof I hereunto affix my signature in the presence of two witnesses, this 19th day of August, 1914.

HARRY S. MEASHEY.

Witnesses:
OTIS O. SCHAEFFER,
EMILE B. SCHAEFFER.

Copies of this patent may be obtained for five cents each, by addressing the "Commissioner of Patents, Washington, D. C."